US011279307B2

(12) United States Patent
Humer

(10) Patent No.: US 11,279,307 B2
(45) Date of Patent: Mar. 22, 2022

(54) SEAT ARRANGEMENT WITH DYNAMIC SEAT POSITIONING SYSTEM

(71) Applicant: LEAR CORPORATION, Southfield, MI (US)

(72) Inventor: Mladen Humer, West Bloomfield, MI (US)

(73) Assignee: LEAR CORPORATION, Southfield, MI (US)

( * ) Notice: Subject to any disclaimer, the term of this patent is extended or adjusted under 35 U.S.C. 154(b) by 308 days.

(21) Appl. No.: 16/550,951

(22) Filed: Aug. 26, 2019

(65) Prior Publication Data

US 2021/0061207 A1 Mar. 4, 2021

(51) Int. Cl.
*B60R 21/01* (2006.01)
*B60N 2/427* (2006.01)
(Continued)

(52) U.S. Cl.
CPC ............ *B60R 21/01* (2013.01); *B60N 2/0244* (2013.01); *B60N 2/42736* (2013.01);
(Continued)

(58) Field of Classification Search
CPC ............ B64D 11/00; B64D 11/06205; B60R 2021/00; B60R 2021/01231; B60R 2021/01252; B60R 2021/23146; B60R 2021/23161; B60R 21/01; B60R 21/01516; B60R 21/0134; B60R 21/0136; B60R 21/207; B60R 21/231; B60R 21/23138; B60R 22/48; B60N 2/00; B60N 2/0244; B60N 2/42736; B60N 2/42745; B60N 2/06; B60N 2/005; B60N 2/0276; B60N 2/01; B60N 2/01508; B60N 2/02; B60N 2/4228; B60N 2/028; B60N 2/04; B60N 2/07;
(Continued)

(56) References Cited

U.S. PATENT DOCUMENTS 6,088,640 A 7/2000 Breed
8,392,071 B2 3/2013 Hashimoto et al.
(Continued)

OTHER PUBLICATIONS

Benedikt Heudorfer et al., "Protection System for Far-Side Occupants in Lateral Crashes", Paper No. 09-0295, 7 Pages.
(Continued)

*Primary Examiner* — Anthony R Jimenez
(74) *Attorney, Agent, or Firm* — Brooks Kushman P.C.

(57) ABSTRACT

A seat arrangement for a vehicle includes a first seat including an airbag module having an inflatable airbag, and a second seat positionable adjacent to the first seat. The second seat includes a pivotable seatback that is pivotable between an upright use position and a forward pivoted position, and a movement mechanism associated with the seatback for moving the seatback from the use position to the pivoted position. The arrangement further includes a control system configured to actuate the movement mechanism to move the seatback of the second seat from the use position to the pivoted position when the second seat is unoccupied and upon detection of a potential vehicle impact, so that the airbag of the airbag module of the first seat may deploy between an occupant of the first seat and the seatback of the second seat.

20 Claims, 3 Drawing Sheets

(51) Int. Cl.
  *B60R 21/0134* (2006.01)
  *B60R 21/015* (2006.01)
  *B60R 21/207* (2006.01)
  *B60R 21/0136* (2006.01)
  *B60R 21/231* (2011.01)
  *B60N 2/02* (2006.01)

(52) U.S. Cl.
  CPC ...... *B60N 2/42745* (2013.01); *B60R 21/0134* (2013.01); *B60R 21/0136* (2013.01); *B60R 21/01516* (2014.10); *B60R 21/207* (2013.01); *B60R 21/231* (2013.01); *B60R 21/23138* (2013.01); *B60N 2/0276* (2013.01); *B60R 2021/01231* (2013.01); *B60R 2021/01252* (2013.01); *B60R 2021/23146* (2013.01); *B60R 2021/23161* (2013.01)

(58) Field of Classification Search
  CPC . B60N 2/12; B60N 2/20; B60N 2/203; B60N 2/206; B60N 2/22; B60N 2/42; B60N 2/4207; B60N 2/4214; B60N 2/4221; B60N 2/427; B60N 2/42727; B60N 2/42772
  USPC .......................................................... 701/45
  See application file for complete search history.

(56) References Cited

U.S. PATENT DOCUMENTS

| 8,612,097 | B2 | 12/2013 | Thomas et al. |
| 8,924,086 | B2* | 12/2014 | Thomas ................ B60R 21/015 701/45 |
| 9,266,487 | B2 | 2/2016 | Engelman et al. |
| 10,011,194 | B1 | 7/2018 | Scott et al. |
| 2014/0358378 | A1* | 12/2014 | Howard ................ F16F 15/022 701/45 |

OTHER PUBLICATIONS

U.S. Appl. No. 16/288,455, filed Feb. 28, 2019 "Gear Assembly", 28 Pages.

* cited by examiner

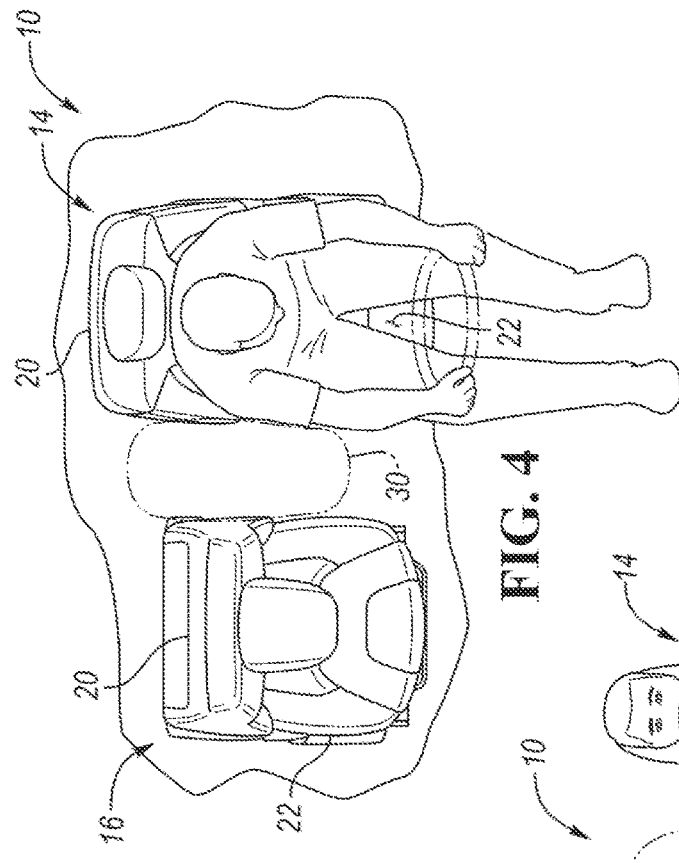
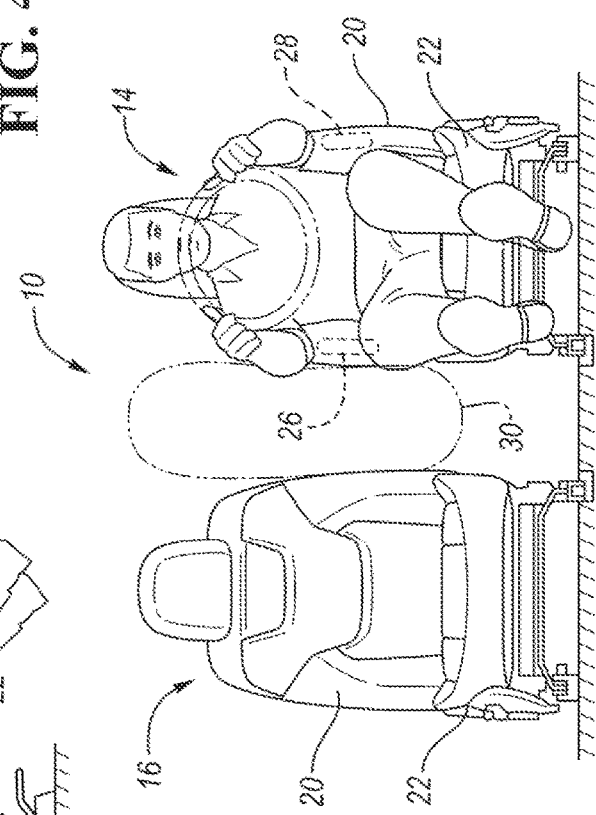
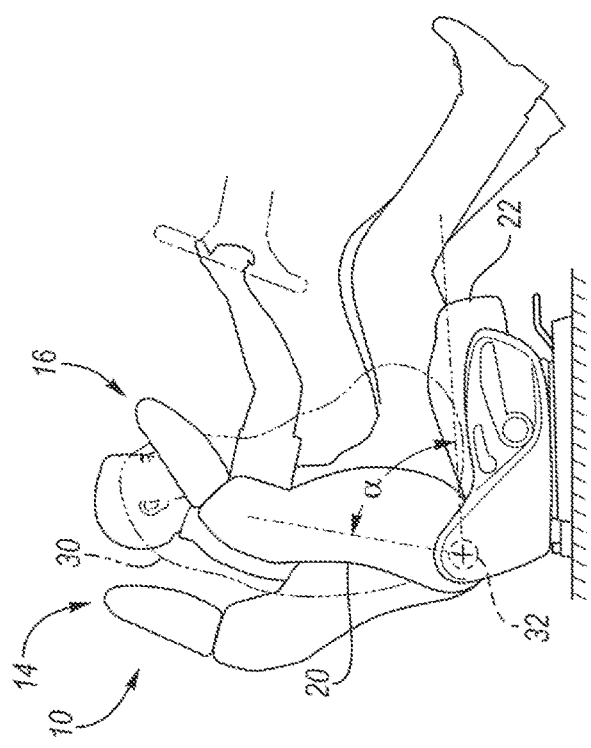

SEAT ARRANGEMENT WITH DYNAMIC SEAT POSITIONING SYSTEM

TECHNICAL FIELD

The disclosure relates to a vehicle seat arrangement with a dynamic seat positioning system, and to a method of operating such a seat arrangement.

BACKGROUND

A number of systems and methods exist for moving a seat in a vehicle into a desired position based on the occurrence of a particular event. Examples of such systems and methods may be found in U.S. Pat. Nos. 9,266,487 B2 and 10,011,194 B1, for example.

SUMMARY

In at least one embodiment according to the disclosure, a seat arrangement for a vehicle includes a first seat including an airbag module having an inflatable airbag, and a second seat positionable adjacent to the first seat. The second seat may include a pivotable seatback that is pivotable between an upright use position and a forward pivoted position, and a movement mechanism associated with the seatback for moving the seatback from the use position to the forward pivoted position. The seat arrangement further includes a control system configured to actuate the movement mechanism to move the seatback of the second seat from the use position to the forward pivoted position when the second seat is unoccupied and upon detection of a potential vehicle impact, so that the airbag of the airbag module of the first seat may deploy between an occupant of the first seat and the seatback of the second seat.

A method is also provided for operating a seat arrangement in a vehicle, wherein the seat arrangement includes a first seat including an airbag module having an inflatable airbag, and a second seat positioned adjacent the first seat. The second seat includes a pivotable seatback that is pivotable between an upright use position and a forward pivoted position, and a movement mechanism associated with the seatback for moving the seatback from the use position to the forward pivoted position. The method includes automatically actuating the movement mechanism to move the seatback of the second seat from the use position to the forward pivoted position when the second seat is unoccupied and upon detection of a potential vehicle impact, so that the airbag of the airbag module of the first seat may deploy between an occupant of the first seat and the seatback of the second seat.

In addition, a system is provided for controlling operation of a seat arrangement in a vehicle, wherein the seat arrangement includes a first seat including an airbag module having an inflatable airbag, and a second seat positioned adjacent the first seat. The second seat includes a pivotable seatback that is pivotable between an upright use position and a forward pivoted position, and a movement mechanism associated with the seatback for moving the seatback from the use position to the forward pivoted position. In at least one embodiment, the system includes a control system including at least one controller and configured to actuate the movement mechanism to move the seatback of the second seat from the use position to the forward pivoted position when the second seat is unoccupied and upon detection of a potential vehicle impact, so that the airbag of the airbag module of the first seat may deploy between an occupant of the first seat and the seatback of the second seat.

While exemplary embodiments are illustrated and disclosed, such disclosure should not be construed to limit the claims. It is anticipated that various modifications and alternative designs may be made without departing from the scope of the disclosure.

BRIEF DESCRIPTION OF THE DRAWINGS

FIG. 2 is a side view of the seat arrangement of FIG. 1 showing a seatback of the second seat in a forward pivoted position and an airbag, shown in phantom lines, of the first seat in a deployed position;

FIG. 3 is a front view of the seat arrangement of FIG. 2 showing the airbag of the first seat positioned between an occupant of the first seat and the seatback of the second seat;

FIG. 4 is a top view of the seat arrangement of FIG. 2; and

DETAILED DESCRIPTION

As required, detailed embodiments are disclosed herein; however, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
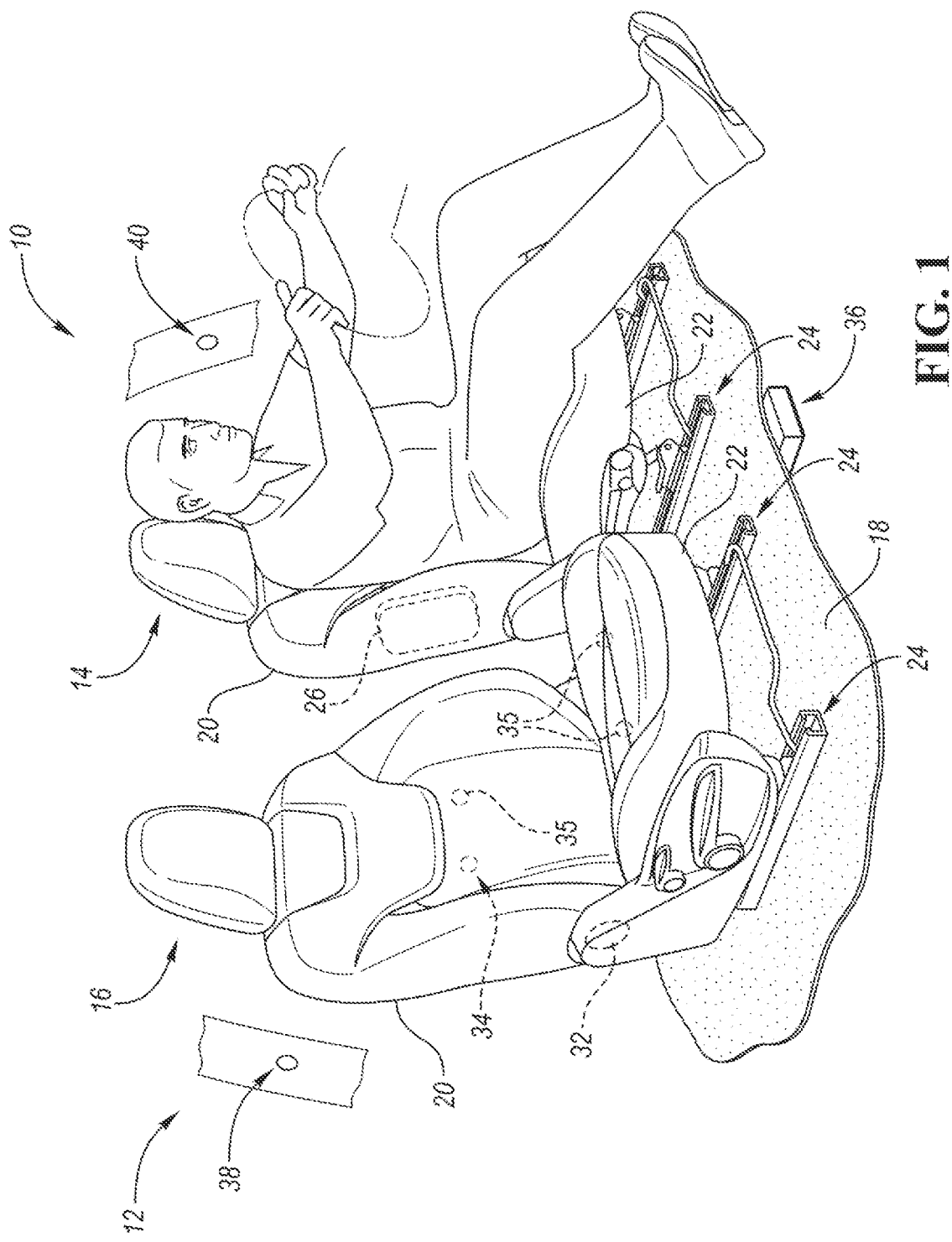
FIG. 1 is a perspective view of a seat arrangement according to the present disclosure, including first and second seats positioned adjacent to each other.

FIG. 1 shows a seat arrangement 10 according to the present disclosure for use with a vehicle 12. The seat arrangement 10 includes first and second seats 14 and 16, respectively, that are positioned adjacent each other and on opposite first and second sides of the vehicle 12. For example, the first seat 14 may be a driver seat mounted on a floor 18 of the vehicle 12 and positioned on a driver's-side of the vehicle 12, and the second seat may 16 be a passenger seat mounted on the floor 18 and positioned on a passenger's side of the vehicle 12. In another embodiment, the seats 14 and 16 may be provided in other seating rows of the vehicle 12, such as a second seating row or a third seating row.

Each seat 14, 16 includes a seatback 20 pivotally connected to a seat bottom 22, and the seat bottom 22 may be mounted on seat track assemblies 24 that are attached to the floor 18. Each seat track assembly 24 may include a first track, such as an upper track, mounted to a particular seat bottom 22, and a second track, such as a lower track, fixedly mounted to the floor 18. In addition, one or both of the seat track assemblies 24 associated with a particular seat 14, 16 may include a movement mechanism connected to the first and second tracks of a respective seat track assembly 24 for moving the first track relative to the second track in a longitudinal direction (e.g., fore/aft) in order to adjust longitudinal position of the seat 14, 16 in the vehicle 12. For example, each movement mechanism may include a motor and gear that are operable to automatically move a respective first track along a respective second track of a seat track assembly 24. As another example, each movement mechanism may include a spring configured to move a respective first track along a respective second track of a seat track assembly 24 after a locking mechanism associated with the seat track assembly 24 has been released. Furthermore, the locking mechanism may be connected to an automatic actuator, such as a release lever, that may be automatically actuated or moved, such as by a motor, to unlock the locking mechanism. One or both of the seat track assemblies 24 for a particular seat 14, 16 may also include a position detector or sensor for determining longitudinal position of the seat 14, 16 or associated seat bottom 22 (e.g., position of the first track relative to the second track of the seat track assembly 24).

The first seat 14 includes an inboard airbag module 26, and may also include an outboard airbag module 28 (shown in FIG. 3). In the illustrated embodiment, the airbag modules 26 and 28 are provided as part of the seatback 20 of the first seat 14 and are mounted inside the seatback 20 (e.g., attached to a corresponding seatback frame). In another embodiment, the airbag modules 26 and 28 may be external airbag modules that are at least partially mounted outside of a trim surface of the seatback 20. Alternatively or supplementally, the first seat 14 may include an inboard airbag module and/or an outboard airbag module provided as part of the seat bottom 22 of the first seat 14. The second seat 16 may also include an inboard airbag module or modules and/or an outboard airbag module or modules (not shown), such as described above with respect to the first seat 14.

Each airbag module 26 and 28 may include an inflatable airbag and an inflator connected to the airbag for inflating the airbag (airbag 30 of the inboard airbag module 26 is shown in phantom lines in FIGS. 2-4). Furthermore, each airbag module 26 and 28 may include a cover, such as a soft fabric cover or a plastic cover that surrounds the airbag and inflator.

The seatback 20 of the second seat 16 is movable from a use position, shown in FIG. 1, to a forward pivoted position, shown in FIG. 2, for providing a reaction surface for the airbag 30 of the inboard airbag module 26, as explained below in more detail. For example, the seatback 20 of the second seat 16 may define an angle α of less than 90° with the corresponding seat bottom 22 when the seatback 20 is in the forward pivoted position. As a more detailed example, the angle α may be in the range of 60° to 80°. The seatback 20 may also be pivotable more forward of the forward pivoted position.

The second seat 16 includes a movement mechanism 32, such as a rapid reposition mechanism, associated with the seatback 20 for automatically moving the seatback 20 from the use position, shown in FIG. 1, to the forward pivoted position, shown in FIG. 2. For example, the movement mechanism 32 may include a gearbox and high-speed motor for rapidly moving the seatback 20. Examples of such a gearbox and motor are disclosed in U.S. patent application Ser. No. 16/288,455, which was filed on Feb. 28, 2019, and is hereby incorporated by reference in its entirety. In another embodiment, the movement mechanism 32 may include a manual recliner mechanism with a spring configured to urge the seatback 20 forwardly when the recliner mechanism is unlocked. That embodiment may further include an automatic actuator, such as a release lever, that may be automatically actuated or moved, such as by a motor, to unlock the recliner mechanism. The second seat 16 may also include a position detector or sensor for determining angular position of the seatback 20 relative to the seat bottom 22. For example, the movement mechanism 32 may include such a position detector or sensor.

In addition, the second seat 16 includes an occupancy detection system 34 for detecting presence of a seat occupant. For example, the occupancy detection system 34 may include one or more sensors 35 (e.g, capacitive sensors, pressure sensors, proximity sensors, etc.) positioned in the seat back 20 and/or seat bottom 22 of the second seat 16 for detecting presence of a seat occupant.

The seat arrangement 10 further includes a control system 36 (shown schematically in FIG. 1) for communicating with and/or controlling operation of the airbag modules 26 and 28, the movement mechanism 32 and the occupancy detection system 34. The control system 36 may include one or more control units or controllers that communicate wirelessly or via wired connections with the airbag modules 26 and 28, the movement mechanism 32 and the occupancy detection system 34. Furthermore, the control system 36 may be located at any suitable position or positions in the vehicle 12. In the embodiment shown in FIG. 1, a controller of the control system 36 is shown mounted in the floor 18 of the vehicle 12.

The control system 36 is configured to actuate the movement mechanism 32 to move the seatback 20 of the second seat 16 from the use position to the forward pivoted position when the second seat 16 is unoccupied and upon detection of a potential vehicle impact, as explained below in more detail. The control system 36 is further configured to control operation of the airbag modules 26 and 28 so that the associated airbags may be deployed at suitable times. For example, the control system 36 may be configured to control operation of the inboard airbag module 26 so that the airbag 30 of the inboard airbag module 26 may deploy between an occupant (e.g., driver) of the first seat 14 and the seatback 20 of the second seat 16 when the seatback 20 is in the forward pivoted position, as shown in FIGS. 3 and 4.

The control system 36 may further include or communicate, wirelessly or via a wired connection, with an impact detection system 38, such as a pre-crash or dynamic safety system. The impact detection system 38 may include a sensor arrangement 40 for detecting a potential vehicle impact, as well as an actual vehicle impact. The sensor arrangement 40 may include one or more sensor systems, such as RADAR systems, LIDAR systems, IR camera systems, ultrasonic sensor systems, etc., positioned at any suitable location on the vehicle 12 (e.g., front portion, side portions and/or rear portion of the vehicle 12) for detecting an impact event or potential impact event. For example, the sensor arrangement 40 may monitor and analyze vehicle surroundings and the vehicle 12 itself in real time to determine if an impact has occurred, or if a potential impact with another vehicle or object may occur (e.g., with another moving or stationary vehicle or object). If such an event is detected, the detection system 38 may provide suitable input to the control system 36.

The occupancy detection system 34, the control system 36 and the impact detection system 38 may individually, collectively, or in any combination comprise appropriate circuitry, such as one or more appropriately programmed processors (e.g., one or more microprocessors, microcontrollers and/or programmable digital signal processors) and associated memory, which may include stored operating system software and/or application software (e.g., code or instructions) executable by the processor(s) for controlling operation thereof, so that the occupancy detection system 34, the control system 36 and impact detection system 38 may perform particular algorithms represented by the functions and/or operations described herein, including interaction between and/or cooperation with each other. One or more of such processors, as well as other circuitry and/or hardware, may be included in a single ASIC (Application-Specific Integrated Circuitry), or several processors and various circuitry and/or hardware may be distributed among several separate components, whether individually packaged or assembled into a SoC (System-on-a-Chip).

Figure 5:
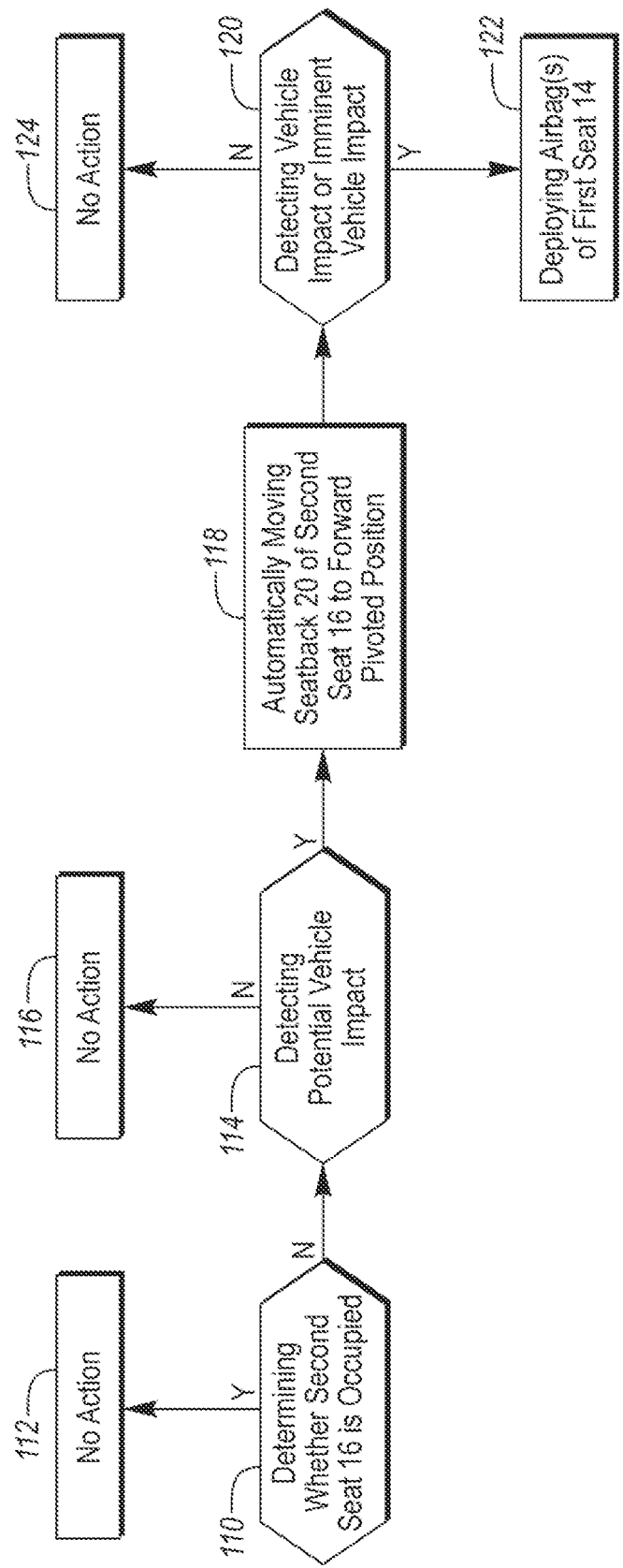
FIG. 5 is a flowchart of a method according to the present disclosure for operating the seat arrangement.

Referring to FIG. 5, a method of operating the seat arrangement 10 will now be described, with reference to FIGS. 1-4. According to block 110 in FIG. 5, the method may include determining whether the second seat 16 is occupied. For example, the occupancy detection system 34 may be used to determine whether the second seat 16 is occupied before actuating the movement mechanism 32 of the second seat 16. If the second seat 16 is occupied, then the movement mechanism 32 may not be actuated even in the event that a potential vehicle impact is detected (e.g., by the impact detection system 38), as indicated by "no action" at block 112 of FIG. 5. The method may further include detecting a potential vehicle impact, as indicated at block 114. For example, the method may involve utilizing the impact detection system 38 to detect a potential impact to either the first side (i.e., driver's side) or the second side (i.e., passenger's side) of the vehicle 12. If no potential vehicle impact is detected, then no further action needs to be taken (e.g., no actuation of the movement mechanism 32), as indicated at block 116. If, however, a potential vehicle impact is detected (e.g., a potential vehicle impact on the second side, i.e., passenger side, of the vehicle 12), then the method may further include automatically moving the seatback 20 of the second seat 16 from the use position, shown in FIG. 1, to the forward pivoted position, shown in FIGS. 2-4, as indicated at block 118 of FIG. 5. Specifically, the control system 36 may actuate the movement mechanism 32 to move the seatback 20 of the second seat 16 from the use position to the forward pivoted position. In that regard, if the movement mechanism 32 includes a high-speed motor, the control system 36 may control operation of that motor to move the seatback 20 forwardly. If the movement mechanism 32 includes a manual recliner with an automatic actuator, then the control system 36 may actuate the actuator to release the recliner so that the spring associated with the manual recliner may move the seatback 20 forwardly. The method may further include detecting an actual vehicle impact or imminent (e.g., unavoidable) vehicle impact, as indicated at block 120, and then actuating one or both of the airbag modules 26, 28 of the first seat 14 to deploy the associated airbag(s) upon detecting the vehicle impact or imminent vehicle impact, as indicated at block 122. For example, if the impact detection system 38 determines that a vehicle impact to the second side of the vehicle 12 is imminent (e.g., based on proximity and/or relative speed of a nearby vehicle or other object), or that an impact to the second side of the vehicle 12 has actually occurred, then the control system 36 may actuate the inboard airbag module 26 so that the associated airbag 30 deploys between the occupant of the first seat 14 and the seatback 20 of the second seat 16. If, however, no vehicle impact or imminent vehicle impact is detected, no further action may be taken, as indicated at block 124.

Furthermore, after a predetermined period of time (e.g., at least 2 seconds or at least 3 seconds) in which no potential vehicle impact, imminent vehicle impact, or actual vehicle impact is detected, the seatback 20 of the second seat 16 may be returned to the use position. For example, the control system 36 may automatically activate the movement mechanism 32 to move the seatback 20 of the second seat 16 from the forward pivoted position to the use position if the movement mechanism 32 includes a motor for moving the seatback 20. If, on the other hand, the movement mechanism 32 includes a manual recliner, then the seatback 20 may need to be manually repositioned or reset to the use position.

The control system 36 may also take into account other factors in determining whether to actuate the seatback 20 of the second seat 16 or one or both of the airbag modules 26, 28 of the first seat 14. For example, the control system 36 may consider relative seat positions of the seats 14 and 16, mass of the occupant of the first seat 14, and/or direction of the potential vehicle impact, imminent vehicle impact and/or actual vehicle impact. As a more specific example, upon detection of a potential vehicle impact, the control system 36 may nonetheless not actuate the movement mechanism 32 to move the seatback 20 of the second seat 16 from the use position to the forward pivoted position if the second seat 16 (e.g., seat bottom 22 of the second seat 16) is positioned too far rearward or too far forward of the first seat 14 (e.g., seat bottom 22 of the first seat 14). In that regard, the control system 36 may only actuate the movement mechanism 32 to move the seatback 20 of the second seat 16 to the forward pivoted position if the second seat 16 (e.g., seat bottom 22 of the second seat 16) is positioned within a desired predetermined longitudinal position range with respect to the first seat 14 (e.g., seat bottom 22 of the first seat 14), as detected by associated position detectors or sensors, for example. Such a predetermined longitudinal position range may be based on position of a center of the seat bottom 22 of the second seat 16 relative to a center of the seat bottom 22 of the first seat 14 in the longitudinal direction of the vehicle 12. For example, the predetermined longitudinal position range may be defined by the center of the seat bottom 22 of the second seat 16 being located within 5 cm rearward to 10 cm forward of the center of the seat bottom 22 of the first seat 14. As another example, the predetermined longitudinal position range may be defined by the center of the seat bottom 22 of the second seat 16 being located within 10 cm rearward to 15 cm forward of the center of the seat bottom 22 of the first seat 14.

If the second seat 16 is not positioned within the desired predetermined longitudinal position range with respect to the first seat 14, the control system 36 may be configured to communicate with (e.g., wirelessly or via wired connections), and control actuation or operation of, one or both of the seat track assemblies 24 associated with the second seat 16 in order to adjust the longitudinal position of the second seat 16 to be within the desired predetermined longitudinal position range to sufficiently align the seats 14 and 16. For example, if the seat track assemblies 24 each include a movement mechanism having a motor, the control system 36 may control actuation and operation of the motor in order to move the second seat 16 either forwardly or rearwardly. As another example, if the seat track assemblies 24 each include a movement mechanism having a spring that is operable to move the second seat 16 forwardly upon release of a corresponding locking mechanism, the control system 36 may be configured to automatically release the locking mechanism (e.g., actuate an automatic actuator associated with the locking mechanism) in order to allow the springs to move the second seat forwardly. Such longitudinal movement of the second seat 16 may occur upon detection of a potential vehicle impact and prior to, during or after movement of the seatback 20 of the second seat 16 from the use position to the forward pivoted position. As another example, such longitudinal movement of the second seat may occur prior to detection of a potential vehicle impact, so that the second seat 16 is within the desired predetermined longitudinal position range should a potential vehicle impact be detected in the future.

Likewise, the control system 36 may only actuate the movement mechanism 32 to move the seatback 20 of the second seat 16 from the use position to the forward pivoted position if a potential impact on the second side of the vehicle 12 is detected, and the control system 36 may only actuate the inboard airbag module 26 if an imminent vehicle impact or actual vehicle impact on the second side of the vehicle 12 is detected. As another example, the control system 36 may actuate the movement mechanism 32 to move the seatback 20 of the second seat 16 from the use position to the forward pivoted position if a potential impact on either the first side or the second side of the vehicle 12 is detected, and the control system 36 may actuate both airbag modules 26 and 28 if an imminent vehicle impact or actual vehicle impact on either the first side or the second side of the vehicle 12 is detected.

With the above seat arrangement 10, the seatback 20 of the second seat 16 may provide a reaction surface for the airbag 30 of the inboard airbag module 26 of the first seat 14 to contact during an impact event in which the airbag 30 is deployed. As a result, movement of the occupant (i.e., the driver) of the first seat 14 into the opposite side (i.e., passenger's side) of the vehicle 12 during an impact event may be inhibited. Likewise, improved retention of the airbag 30 may be achieved.

As a result of an impact to the second side of the vehicle 12 (i.e., far side of the vehicle 12 with respect to the driver), the driver may make initial contact with the airbag 30 of the inboard airbag module 26. As a result of an impact to the first side of the vehicle 12 (i.e., near side of the vehicle 12 with respect to the driver), the driver may make initial contact with the airbag of the outboard airbag module 28, and then may subsequently make contact with the airbag 30 of the inboard airbag module 26 during rebound movement of the driver, for example. Therefore, the above configuration may provide benefits in connection with an impact on either side of the vehicle 12.

It should be noted that if the second seat 16 is already positioned in a suitable position relative to the first seat 14 so that the seatback 20 of the second seat 16 may provide a suitable reaction surface for the airbag 30 of the inboard airbag module 26 of the first seat 14, then the control system 36 may determine that no actuation of the movement mechanism 32 or seat track assemblies 24 of the second seat 16 is needed upon detection of a potential vehicle impact. For example, if the first seat 14 is positioned at or near a full rear position on its seat track assemblies 24, and the second seat 16 is positioned at or near a full forward position on its seat track assemblies 24, then the seatback 20 of the second seat 16 may be in a suitable position to provide a reaction surface for the airbag 30 of the inboard airbag module 26 of the first seat 14 even with the seatback 20 of the second seat 16 in the use position. As a more specific example, if the center of the seat bottom 22 of the second seat 16 is positioned at least 10 cm forward of the center of the seat bottom 22 of the first seat 14, then no actuation of the movement mechanism 32 or seat track assemblies 24 of the second seat 16 may be needed upon detection of a potential vehicle impact.

As mentioned above, a seat arrangement according to the disclosure may also or instead be used in any other seating row of the vehicle 12. Furthermore, all seats in the other seating rows may each be provided with the above-described movement mechanism and airbag module(s) so that a seatback of any seat may be actuated as needed during a potential impact event to provide a reaction surface for an airbag deployed from an adjacent seat as a result of an imminent or actual impact event.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A seat arrangement for a vehicle, the seat arrangement comprising:
   a first seat including an airbag module having an inflatable airbag;
   a second seat positionable adjacent to the first seat, the second seat including a pivotable seatback that is pivotable between an upright use position and a forward pivoted position, and a movement mechanism associated with the seatback for moving the seatback from the upright use position to the forward pivoted position; and
   a control system configured to actuate the movement mechanism to move the seatback of the second seat from the upright use position to the forward pivoted position when the second seat is unoccupied and based on input from an impact detection system, so that the airbag of the airbag module of the first seat may deploy between an occupant of the first seat and the seatback of the second seat.

2. The seat arrangement of claim 1 wherein the first seat is a driver seat, and the second seat is a passenger seat.

3. The seat arrangement of claim 1 wherein the first and second seats are positionable in the vehicle as second row seats.

4. The seat arrangement of claim 1 wherein the seatback of the second seat provides a reaction surface for the airbag to contact when the seatback of the second seat is in the forward pivoted position and the airbag is deployed.

5. The seat arrangement of claim 1 wherein the control system is configured to actuate the movement mechanism to move the seatback of the second seat to the forward pivoted position prior to an actual vehicle impact, and wherein the control system is further configured to cause the airbag of the airbag module to deploy during the actual vehicle impact.

6. The seat arrangement of claim 1 wherein the first seat is positionable on a first side of the vehicle, and the second seat is positionable on a second side of the vehicle opposite the first side, and wherein the control system is configured to actuate the movement mechanism upon detection of a potential vehicle impact on the second side of the vehicle.

7. The seat arrangement of claim 1 wherein the first seat is positionable on a first side of the vehicle, the second seat is positionable on a second side of the vehicle opposite the first side, the airbag module is positioned on an inboard side of the first seat, and the first seat further includes an additional airbag module positioned on an outboard side of the first seat, the additional airbag module including an additional inflatable airbag, and wherein the control system is configured to cause the airbag and the additional airbag to deploy upon detection of a vehicle impact on the first side of the vehicle.

8. The seat arrangement of claim 1 wherein the second seat includes a seat bottom, and the seatback of the second seat defines an angle of less than 90° with the seat bottom when the seatback is in the forward pivoted position.

9. The seat arrangement of claim 8 wherein the angle is in the range of 60° to 80°.

10. The seat arrangement of claim 1 further comprising a seat track assembly for mounting the second seat to the vehicle, the seat track assembly being configured to adjust a longitudinal position of the second seat when the second seat is mounted in the vehicle, wherein the control system is configured to actuate the seat track assembly to adjust the longitudinal position of the second seat when the second seat is not within a predetermined longitudinal position range with respect to the first seat.

11. The seat arrangement of claim 10 wherein the control system is configured to actuate the seat track assembly to adjust the longitudinal position of the second seat when the second seat is not within the predetermined longitudinal position range with respect to the first seat upon detection of a potential vehicle impact.

12. A method for operating a seat arrangement in a vehicle, wherein the seat arrangement includes a first seat including an airbag module having an inflatable airbag, and a second seat positioned adjacent the first seat, the second seat including a pivotable seatback that is pivotable between an upright use position and a forward pivoted position, and a movement mechanism associated with the seatback for moving the seatback from the upright use position to the forward pivoted position, the method comprising:
  automatically actuating the movement mechanism to move the seatback of the second seat from the upright use position to the forward pivoted position when the second seat is unoccupied and upon detection of a potential vehicle impact, so that the airbag of the airbag module of the first seat may deploy between an occupant of the first seat and the seatback of the second seat.

13. The method of claim 12 wherein the step of automatically actuating the movement mechanism to move the seatback of the second seat from the upright use position to the forward pivoted position is performed prior to an actual vehicle impact.

14. The method of claim 12 further comprising determining whether the second seat is occupied using an occupancy detection system before actuating the movement mechanism.

15. The method of claim 14 further comprising utilizing a detection system to detect the potential vehicle impact.

16. The method of claim 15 further comprising actuating the airbag module to deploy the airbag upon detecting a vehicle impact or imminent vehicle impact.

17. The method of claim 12 wherein the second seat is mounted on a seat track assembly that is attached the vehicle, the seat track assembly being configured to adjust longitudinal position of the second seat, and wherein the method further includes automatically actuating the seat track assembly to adjust the longitudinal position of the second seat when the second seat is not within a predetermined longitudinal position range with respect to the first seat.

18. The method of claim 17 wherein the step of automatically actuating the longitudinal position of the second seat is performed upon detection of the potential vehicle impact.

19. A system for controlling operation of a seat arrangement in a vehicle, wherein the seat arrangement includes a first seat including an airbag module having an inflatable airbag, and a second seat positioned adjacent the first seat, the second seat including a pivotable seatback that is pivotable between an upright use position and a forward pivoted position, and a movement mechanism associated with the seatback for moving the seatback from the upright use position to the forward pivoted position, the system comprising:
  a control system including at least one controller and configured to actuate the movement mechanism to move the seatback of the second seat from the upright use position to the forward pivoted position when the second seat is unoccupied and based on input from an impact detection system, so that the airbag of the airbag module of the first seat may deploy between an occupant of the first seat and the seatback of the second seat.

20. The system of claim 19 wherein the control system is configured to actuate the movement mechanism to move the seatback of the second seat to the forward pivoted position prior to an actual vehicle impact, and wherein the control system is further configured to cause the airbag of the airbag module to deploy during the actual vehicle impact.

* * * * *